US006976251B2

(12) United States Patent
Meyerson

(10) Patent No.: US 6,976,251 B2
(45) Date of Patent: Dec. 13, 2005

(54) INTELLIGENT UPDATE AGENT

(75) Inventor: Matthew S. Meyerson, LaGrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 689 days.

(21) Appl. No.: 09/867,923

(22) Filed: May 30, 2001

(65) Prior Publication Data

US 2002/0184619 A1   Dec. 5, 2002

(51) Int. Cl.[7] .............................................. G06F 9/44
(52) U.S. Cl. ..................................................... 717/173
(58) Field of Search ................................ 717/168–178

(56) References Cited

U.S. PATENT DOCUMENTS

| | | | |
|---|---|---|---|
| 5,717,934 A | | 2/1998 | Pitt et al. |
| 5,752,042 A | * | 5/1998 | Cole et al. ................... 717/173 |
| 5,764,992 A | | 6/1998 | Kullick et al. |
| 5,845,077 A | * | 12/1998 | Fawcett ....................... 709/221 |
| 5,999,740 A | | 12/1999 | Rowley |
| 6,151,708 A | * | 11/2000 | Pedrizetti et al. ............. 717/173 |
| 6,701,521 B1 | * | 3/2004 | McLlroy et al. ............. 717/173 |

* cited by examiner

Primary Examiner—Kakali Chaki
Assistant Examiner—Trenton J. Roche
(74) Attorney, Agent, or Firm—DeLio & Peterson, LLC; Kelly M. Nowak; Jay H. Anderson

(57) ABSTRACT

A method of updating computer software includes downloading software update information through a network, such as the Internet, to a user's computer. The download is preferably done periodically and automatically. If available, a criticality check program identified in the software update information is then automatically downloaded and executed to determine the configuration of the user's computer. The criticality and applicability of available software updates are evaluated by the criticality check program in light of the specific software and/or hardware configuration of the user's computer. The software updates may then be downloaded and installed automatically, if previously authorized by the user, by comparing the criticality of the updates to the user, as determined by the criticality check program, to stored user preference information specifying a user criticality threshold. Software updates determined to be more critical than the user criticality threshold are installed automatically and the user is notified of the availability of less critical updates.

24 Claims, 1 Drawing Sheet

INTELLIGENT UPDATE AGENT

BACKGROUND OF THE INVENTION

1. Field of the Invention

The present invention relates to a method for updating software on a timely basis.

2. Description of Related Art

This invention is concerned with the problem of updating software installed on a large number of computers having different configurations. Software may be changed in order to provide additional features, fix problems (bugs) in earlier releases of the software, improve security, or for other reasons. Immediate installation of some software updates may be critical for proper operation of the software or to improve security of the software. The installation of other software updates may be optional or even irrelevant, depending on the configuration of the computer.

Whether the installation of a software update is critical depends partly upon information known to the software publisher (the purpose of the update) and partly upon information relating to the configuration of the computer, including such things as the computer hardware installed, the operating system in use, other software installed, etc. For example, an update to software A may be essential to fix interoperability problems between software A and software B, but many, or most computers may not have software B installed. In this case, installation of the update to software A would be relatively unimportant for the majority of users.

Although the intended effect of installing an update is known, the installation of an update may have unintended and undesirable effects. It is not possible to test software changes on all possible computer configurations. Occasionally, updates will introduce bugs or cause unexpected program behavior. Consequently, many users want to control the installation of updates and avoid the installation of non-critical updates.

These considerations make the timely installation of critical updates difficult. Once an update is written, its availability must be communicated to the end user and a decision must be made as to whether the update should be installed. The historical approach has been to notify users of the availability of a software update and allow them to obtain and install it if they decide it is necessary. This approach has caused extended delays in obtaining wide distribution of updates, even when the updates are critical.

Another approach to this problem has been to use the Internet to automatically convey the availability of an update to the user by having the software poll a server to determine if an update is available. The polling may be automatic or performed manually at the instigation of the user. The downloading and installation of the software update may be automatic or performed only after approval of the user.

If the polling and installation of the software update is performed automatically, it ensures rapid distribution, but this procedure is objectionable to many users who do not want a working installation modified needlessly.

Another approach is to provide the user information about the criticality and relevance of the update to different computer configurations. The user is asked to manually install the update or authorize the installation before it proceeds. This approach slows the spread of critical updates. It also requires that the user be able to understand the importance of the update and understand the configuration of the computer to determine if the update is applicable to his computer configuration. If the user doesn't understand the relevance of the update to his configuration, he may postpone the installation, even where the update is critical.

Bearing in mind the problems and deficiencies of the prior art, it is therefore an object of the present invention to provide a method of updating computer software that provides for automatic installation of critical updates and manual installation of less critical updates.

It is another object of the present invention to provide a method of updating computer software that takes into account the configuration of the computer to determine the criticality of a software update.

A further object of the invention is to provide a method of updating computer software that allows a user to determine in advance which software updates will be automatically installed and which will not be automatically installed depending on the criticality of a software update.

Still other objects and advantages of the invention will in part be obvious and will in part be apparent from the specification.

SUMMARY OF THE INVENTION

The above and other objects and advantages, which will be apparent to one of skill in the art, are achieved in the present invention which is directed to a method of updating computer software that includes downloading software update information through a network, such as the Internet, to a user's computer. The download is preferably done periodically and automatically. A criticality check program, identified in the software update information, is then automatically downloaded and executed to determine the specific configuration of the user's computer.

The criticality and applicability of available software updates is evaluated by the criticality check program in light of the specific software and/or hardware configuration of the user's computer. The software updates may then be downloaded and installed automatically, if previously authorized by the user, by comparing the criticality of the updates to the user, as determined by the criticality check program, to stored user preference information specifying a user criticality threshold. Software updates determined to be more critical than the user criticality threshold are installed automatically and the user is notified of the availability of less critical updates.

In one general aspect of the invention the method comprises downloading the software update information through a network to the computer, then determining if a software update is available from the software update information. If at least one software update is available, and if a criticality check program is available, the criticality check program is downloaded through the network to the computer. The criticality check program may not be provided if the criticality is uniform for all computers.

After the criticality check program is downloaded, it is executed to determine relevant information about the hardware and/or software configuration of the user's computer. The criticality of the software update is evaluated by the criticality check program and from the software update information, which preferably contains an initial criticality rating determined by the software publisher. If the criticality is uniform for all computers, the initial criticality rating is used as the evaluated criticality rating. User preference information, previously stored on the user's computer, is then accessed and used to determine if the software update should be automatically downloaded and installed.

The step of downloading software update information may be preceded by sending a software update query requesting the software update information. The query may contain information, such as a list of software on the user's computer that may need to be updated, or a list of software publishers who published software on the user's computer that may need to be updated. The software update information may contain information only about specific software identified in the software update query or it may contain a list of software updates available. The software update information may be tailored depending on the information sent in the initial query.

The software update information preferably includes a location for downloading each available software update, a location for downloading an applicable criticality check program and an initial criticality rating for each software update that is available. A check program may be made available for each software update, for each software publisher, or a single program may be used for all participating software publishers.

After the user's preferences are checked, authorized critical updates are automatically downloaded and installed, and the user is notified. The user is also notified of available less critical updates where automatic installation was not authorized. If a computer reboot is necessary, the user is notified and requested to authorize the reboot.

The invention also includes a computer program product for updating computer software on a computer. The computer program product includes a computer readable program code means for downloading software update information through a network to the computer, computer readable program code means for determining if a software update is available from the software update information, computer readable program code means for downloading a criticality check program through the network to the computer, computer readable program code means for executing the criticality check program on the computer, computer readable program code means for evaluating the criticality of the software update from an output of the criticality check program and the software update information, computer readable program code means for accessing stored user preference information, and computer readable program code means for determining if the software update should be automatically downloaded and installed from the user preference information and the evaluated criticality of the software update.

The invention also includes a program storage device readable by a machine, tangibly embodying a program of instructions executable by the machine to perform the method steps of the invention.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
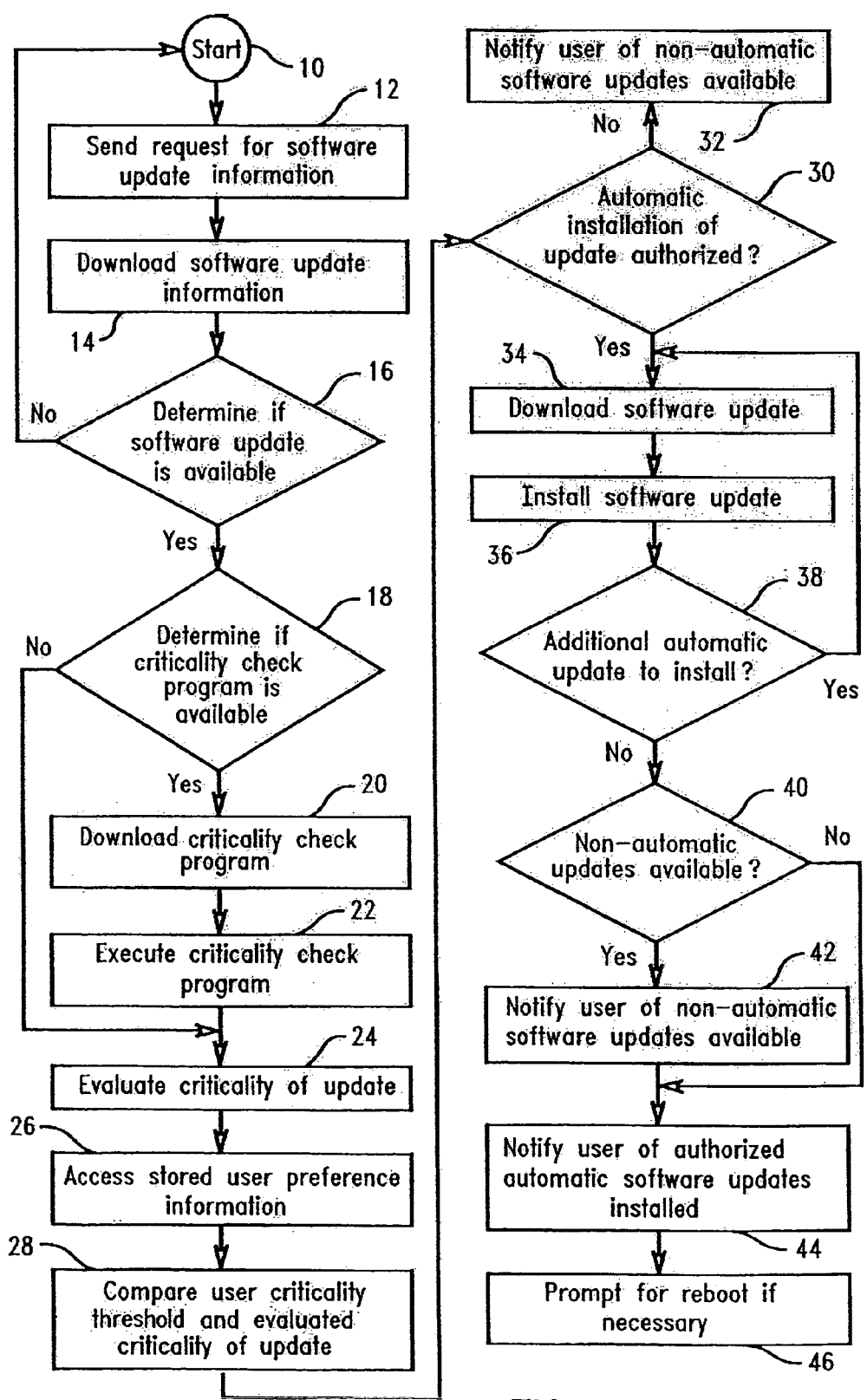
FIG. 1 is a flow diagram showing a method in accordance with this invention.

Referring to FIG. 1, the intelligent update agent of this invention begins its program flow at start point 10. The intelligent update agent may be designed in accordance with this invention so that the program is started manually, however, in the preferred implementation, the start point 10 includes program code with a timer that periodically restarts program flow to regularly check for the existence of software updates. The intelligent update agent software may also be provided with a user setting to change between manual and automatic starting and to set the period of time between automatic starts.

Once flow has started, it proceeds to block 12 where the intelligent update agent sends a software update query comprising a request for software update information. The software update query is sent over a computer network, such as the Internet. In one implementation of the invention, the intelligent update agent is designed specifically for and may be incorporated into particular software. The agent will then include the address of a particular location maintained by the software publisher that corresponds to the software. In this type of implementation, the software update query contains very little information. The software publisher knows that all queries arriving at a particular location are requests for software update information corresponding to that location.

In a more general implementation of the invention, the update agent may be designed by a particular software publisher to handle all of that publisher's software. In this design, the request for software update information may carry with it software identification information comprising a list of all of the software by that software publisher that is installed on the user's computer.

In yet another implementation of the invention, the update agent may be designed for handling multiple software publishers. In this case the software update query may contain software publisher information that identifies the software publishers of software installed on the user's computer. Alternatively, it may carry both software publisher information and software identification information or only software identification information.

After the software update query is sent, the software update information is downloaded in block 14. In the simplest case, where the update agent corresponds to a single software program, the software update information may simply be a "yes" or "no" telling the agent whether a software update is available and whether a criticality check program is available. In the more general case, however, the software update information will include substantial additional information for multiple software programs. In the preferred implementation of the invention, the software update information will include a field telling the update agent whether a criticality check program is available for each software update. In addition, the software update information will include an address field telling the update agent where to find the criticality check program, if one is available, an address field telling the update agent where to find the software update itself, and a field containing an initial criticality rating for the software update.

The software update information may provide information about only software identified in the update query. However, the preferred design is for the update query to identify the software publishers having software installed on the users computer and for the software update information to include a list of software updates available for software published by the publishers identified in the initial software update query.

Those of skill in the art will recognize that the amount of information contained in the software update query from the user's computer and the amount of information carried in the software update information response may be varied. This allows the designer of the update agent software to distribute the workload between the update agent making the request and the server providing the response and to control the amount of traffic required between the user's computer and the server computer. However, after the software update information is downloaded, the intelligent update agent will have sufficient information to determine whether a software update is available for each software program being managed by the update agent.

In decision block 16 the update agent decides whether to proceed based on the software update information downloaded in block 14. If no updates are available, flow returns to start block 10 and the update agent waits for either automatic restarting or manual restarting according to the user settings as described above. However, if there is at least one software update available, program flow proceeds to decision block 18.

In decision block 18, the update agent determines if a criticality check program is available for the software updates that are available. It is preferred that this information be in the software update information initially downloaded in block 14, however it may be determined from an additional round of communication across the computer network.

The criticality rating is determined by the software publisher and typically will be higher for more critical updates and lower for optional upgrades. For the most critical upgrades, it may not be necessary to provide a criticality check program, as the software publisher may want the upgrade installed in all cases, regardless of the user's computer configuration. However, more commonly, the criticality of the installation will depend on the computer configuration. In this case, the software publisher will provide a criticality check program.

The purpose of the criticality check program is to examine the user's computer and adjust the initial criticality rating for the software update (obtained from the software update information) in light of an evaluation of the user's computer configuration performed by the check program. For example, in the case where an update to software program A is critical for users having software program B installed, but otherwise is irrelevant, the initial criticality rating in the software update information may be set to 10 on a scale form 1 to 10. The software publisher would also provide a criticality check program, which would check for the existence of software program B. If software program B is not found to be installed, the initial criticality rating might be adjusted downward to an evaluated criticality rating of 1.

The evaluated criticality rating represents the software publisher's estimate of the importance of installing the update in light of the specific configuration of the user's computer. This design for the update agent allows great flexibility for evaluating the criticality of a software update. The initial criticality rating may be adjusted upward or downward by the check program. If desired, the initial criticality rating may be eliminated entirely from the software update information and instead be calculated by the check program. Alternatively, the check program may be eliminated if the software publisher believes the criticality is the same for all installations of the software.

If a criticality check program is provided for the software update, program flow proceeds to block 20 and the criticality check program is downloaded from the location provided in the software update information. As soon as the criticality check program is downloaded, it is executed in block 22. The criticality check program produces an output and the criticality of the update is evaluated from that output in block 24 by adjusting the initial criticality rating in light of the results of the criticality check program's investigation of the user's computer configuration.

If a criticality check program is not available, program flow proceeds from block 18 directly to block 24 where the initial criticality rating is retained without adjustment for the remainder of the processing. In the preferred implementation, a single criticality check program will adjust the initial criticality rating for each software update that is available. However, program flow for the update agent may be modified to separately download and execute individualized criticality check programs for each available software update or to download a separate criticality check program for each software publisher.

At the conclusion of step 24, the update agent will have determined the software publisher's estimate of the criticality of each available software update in light of the user's individual computer configuration. Program flow then proceeds to block 26. In block 26, the update agent accesses user preference information stored on the user's computer. This information is obtained from the user at the time the intelligent update agent is installed. Such installation may occur when software to be managed by the update agent is installed, or it may be a separate installation. During or after such installation, the user will have the opportunity to set preferences as to what software updates should be automatically installed.

For example, the user may set a preference that no automatic installations are allowed. It is expected, however, that most users will authorize automatic installation for the most critical updates and that this will be the default setting. In the preferred method of the invention the user sets a user criticality threshold in the user preference information. If the user criticality threshold were set to 8 it would allow automatic installation of software updates having an evaluated criticality of 8 or above and prevent automatic installation of less critical updates. Setting the threshold to above the maximum evaluated criticality rating of 10 would completely prevent automatic installation. Setting the user criticality threshold to 0 would automatically install all applicable updates.

Although the invention may be implemented with a single numerical rating for the criticality for all updates, it is also contemplated that other algorithms with multiple types of criticality ratings or other additional information may be used for determining the criticality of an update and the user's preference for installation of the update. For example, the user may be allowed to set a separate criticality threshold for each software publisher or for each software product. This would, for example, allow a user to specify a higher threshold for a network product than for a simple application program.

The invention may also be implemented such that the software publisher defines the update in the software update information as a particular type or class of update, such as a security update or a software function improvement update. The user would be allowed to set different criticality thresholds for the different types of updates. This would allow a user to specify in the stored user preference information that all security upgrades are installed automatically, but updates that add functionality to a program are not installed automatically.

In block 26, the intelligent update agent accesses the stored user preference information, including the stored user criticality threshold. In block 28, the intelligent update agent compares the stored user criticality threshold to the evaluated criticality from block 24. If there are multiple updates, this comparison is done for each update. In decision block 30 the results of the comparison are used to determine if the user has authorized any of the available updates to be automatically installed. If the user has set the user criticality threshold so high that no updates are authorized for automatic installation, flow proceeds to block 32 and the user is notified of the existence of the update. The notification in block 32 may include a click button allowing the intelligent update agent to automatically download and install the update after manual authorization by the user by clicking the button.

If the user has set the user criticality threshold to allow automatic installation of at least one software update, flow proceeds to block 34 and the software update is downloaded from the address specified in the software update information and then installed (block 36). If there are any additional software updates to install, flow proceeds from block 38 and back to block 34 until all of the software updates are installed.

Flow then proceeds to block 40. If there are additional updates that the update agent is not authorized to install, the user is notified in block 42, in a manner similar to the user notification in block 32. If all the updates were installed automatically, block 42 is skipped and flow proceeds directly to block 44 where the user is notified of the updates that were installed. After the notification is acknowledged, flow proceeds to block 46 where the user is prompted to authorize a reboot of the computer if this is necessary for the updates installed. A request to reboot may also be prompted at the completion of block 36 if an individual update requires a reboot before any additional updates can be installed.

Regardless of whether flow passes through block 46 or block 32, it ultimately returns to the start 10 where the process can be restarted either manually or by the timed automatic method as determined by the user in the stored user preferences.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A method of updating computer software on a computer comprising:
   downloading software update information through a network to the computer;
   determining if a software update is available from the software update information;
   downloading a criticality check program through the network to the computer;
   executing the criticality check program on the computer;
   evaluating the criticality of the software update from an output of the criticality check program and the software update information;
   accessing stored user preference information that includes a user criticality threshold; and
   determining if the software update should be automatically downloaded and installed by comparing the user criticality threshold of the user preference information and the evaluated criticality of the software update.

2. The method of claim 1 wherein the software update information includes a criticality rating.

3. The method of claim 2 wherein the step of executing the criticality check program on the computer includes determining the configuration of the computer and the step of evaluating the criticality of the software update includes adjusting the criticality rating from the software update information dependent upon the configuration of the computer to produce the evaluated criticality of the software update.

4. The method of claim 1 wherein the software update information includes a location for downloading the criticality check program.

5. The method of claim 4 wherein the step of downloading the criticality check program includes downloading the criticality check program from the criticality check program location.

6. The method of claim 1 wherein the software update information includes a location for downloading the software update.

7. The method of claim 6 further including the steps of:
   downloading the software update from the software update location; and
   automatically installing the software update.

8. The method of claim 7 further including the step of producing a notification that the software update has been installed.

9. The method of claim 8 further including the steps of determining if a computer reboot is necessary and including a request in the notification that the computer be rebooted if a computer reboot is necessary.

10. The method of claim 8 further including the step of notifying the user of the availability of additional software updates.

11. The method of claim 1 further including the step of producing a notification if it is determined from the user preference information and the evaluated criticality of the software update that the software update should not be automatically downloaded and installed.

12. The method of claim 1 further including the step of determining from the software update information whether to skip the steps of downloading and executing the criticality check program and evaluating the criticality of the software update, and wherein the step of determining if the software update should be automatically downloaded and installed comprises comparing the user criticality threshold included in the user preference information with a criticality rating included in the software update information.

13. The method of claim 1 wherein the step of downloading software update information comprises periodically automatically downloading software update information through the network to the computer.

14. The method of claim 1 wherein the step of downloading software update information includes sending a software update query through the network requesting the software update information.

15. The method of claim 14 wherein the software update query includes software identification information identifying software to be updated and the software update information relates to the software to be updated identified in the software identification information.

16. The method of claim 14 wherein the software update query includes software publisher information identifying a publisher of software to be updated and the software update information includes a list of software updates available for software published by the publisher identified in the software identification information.

17. The method of claim 16 wherein the step of determining if a software update is available from the software update information comprises determining from the list of software updates if a software update is available for software on the computer.

18. The method of claim 16 wherein the software update query includes software publisher information identifying at least one additional publisher of software to be updated and the software update information includes a list of software updates available for software published by each publisher identified in the software identification information.

19. A method of updating computer software on a computer comprising:
    downloading software update information through a network to the computer, the software update information including a criticality rating for a software update identified in the software update information;
    accessing stored user preference information, the user preference information including a criticality threshold set by a user of the computer;
    determining if the software update is a critical software update by comparing the criticality rating to the criticality threshold;
    automatically downloading the software update if the software update is a critical software update; and
    automatically installing the software update if the software update is a critical software update.

20. A method of updating computer software on a computer comprising:
    periodically automatically downloading software update information through a network to the computer, the software update information including:
    a location for downloading a software update, a criticality rating for the software update, and a location for downloading a criticality check program;
    automatically downloading the criticality check program through the network to the computer;
    executing the criticality check program on the computer;
    evaluating the criticality of the software update from an output of the criticality check program and the criticality rating;
    accessing stored user preference information containing a user criticality threshold; and
    determining if the software update should be automatically downloaded and installed by comparing the user criticality threshold and the evaluated criticality of the software update.

21. A computer program product for updating computer software on a computer, said computer program product having:
    computer readable program code means for downloading software update information through a network to the computer;
    computer readable program code means for determining if a software update is available from the software update information;
    computer readable program code means for downloading a criticality check program through the network to the computer;
    computer readable program code means for executing the criticality check program on the computer;
    computer readable program code means for evaluating the criticality of the software update from an output of the criticality check program and the software update information;
    computer readable program code means for accessing stored user preference information that includes a user criticality threshold; and
    computer readable program code means for determining if the software update should be automatically downloaded and installed by comparing the user criticality threshold of the user preference information and the evaluated criticality of the software update.

22. A program storage device readable by a machine, tangibly embodying a program of instructions executable by the machine to perform method steps for updating computer software on a computer, said method steps comprising:
    downloading software update information through a network to the computer;
    determining if a software update is available from the software update information;
    downloading a criticality check program through the network to the computer;
    executing the criticality check program on the computer;
    evaluating the criticality of the software update from an output of the criticality check program and the software update information;
    accessing stored user preference information that includes a user criticality threshold; and
    determining if the software update should be automatically downloaded and installed by comparing the user criticality threshold of the user preference information and the evaluated criticality of the software update.

23. A computer program product for updating computer software on a computer, said computer program product having:
    computer readable program code means for downloading software update information through a network to the computer, the software update information including a criticality rating for a software update identified in the software update information;
    computer readable program code means for accessing stored user preference information, the user preference information including a criticality threshold set by a user of the computer;
    computer readable program code means for determining if the software update is a critical software update by comparing the criticality rating to the criticality threshold;
    computer readable program code means for automatically downloading the software update if the software update is a critical software update; and
    computer readable program code means for automatically installing the software update if the software update is a critical software update.

24. A program storage device readable by a machine, tangibly embodying a program of instructions executable by the machine to perform method steps for updating computer software on a computer, said method steps comprising:
    downloading software update information through a network to the computer, the software update information including a criticality rating for a software update identified in the software update information;
    accessing stored user preference information, the user preference information including a criticality threshold set by a user of the computer;
    determining if the software update is a critical software update by comparing the criticality rating to the criticality threshold;
    automatically downloading the software update if the software update is a critical software update; and
    automatically installing the software update if the software update is a critical software update.

* * * * *